Sept. 5, 1967    W. C. HOCH    3,339,998
STEREOSCOPIC MOTION PICTURE FILM
Filed Nov. 23, 1966    2 Sheets-Sheet 1

INVENTOR.
WINTON C. HOCH
BY
ATTORNEY

Sept. 5, 1967　　　　　　　　W. C. HOCH　　　　　　　　3,339,998
STEREOSCOPIC MOTION PICTURE FILM Filed Nov. 23, 1966　　　　　　　　　　　　　　　　2 Sheets-Sheet 2

INVENTOR.
WINTON C. HOCH
BY Reed C. Lawlor
ATTORNEY

United States Patent Office 3,339,998
Patented Sept. 5, 1967

3,339,998
STEREOSCOPIC MOTION PICTURE FILM
Winton C. Hoch, 1491 Stone Canyon Road,
Los Angeles, Calif. 90024
Filed Nov. 23, 1966, Ser. No. 596,568
6 Claims. (Cl. 352—239)

This application is a continuation-in-part of my copending application Ser. No. 323,807 filed Nov. 14, 1963.

This invention relates in general to improvements in film used in three-dimensional or stereoscopic photography and particularly to improvements in film produced in stereoscopic motion picture cameras or otherwise, whereby incorrect projection of the film is immediately apparent and correctable with customary types of projector framing controls.

In the projection of stereoscopic motion pictures wherein a single strip of film is used and the left-view and right-view images are shown simultaneously on a viewing screen, in order for members of the audience to perceive the stereoscopic effect, it is necessary to properly register the film in the projector to insure that the right-view image is projected through the right-view section of the projector and that the left-view image is projected through the left-view section of the projector.

One prior art method of insuring proper registration of the stereoscopic motion picture film in the projector is to provide registration marks on the film such as marks adjacent each left-view or each right-view image on the film itself. This method requires marking of the film manually or by the use of components in the camera which produce the registration marks on the film as the film passes through the camera or the use of special printing techniques.

The present invention provides a method for automatically insuring proper identification of the stereoscopic motion picture images without using auxiliary identification marks on the film.

The invention essentially resides in the displacement along the length of the film of the left-view images and the right-view images relative to each other so that when the film is improperly framed in a projector which would otherwise properly project the film, the frames of the two images appearing on the screen will not be superpositioned or completely overlapped, that is the frame lines at the top and bottom will not coincide. In this invention, due to the pattern of spacing of images on the film the frames will only partially overlap vertically, leaving a space at the top and bottom of the screen in which parts of only one of each of the views can be seen. This error will be so obvious that immediate correction can be made with customary types of projector framing controls.

In the best embodiment of the invention as presently practiced, the spacing of the images on the film is due to the design of the camera used.

The camera which is used in conjunction with one embodiment of this invention is described in applicant's copending application Ser. No. 323,807 and employs novel mechanical and optical arrangements which are of such a character that they can be readily incorporated in the design of motion picture cameras embodying many conventional design features and are applicable to all motion pictures of various sizes including those made with standard film and frame sizes. One of the novel features of said camera is the use of a film gate that is provided with a pair of picture apertures that are spaced apart vertically by a substantial distance to accommodate the needed optical and mechanical elements so that the same film is simultaneously exposed to the right-view image of a scene in one aperture and left-view image of the same scene in the other aperture.

In the camera mentioned above, two optical means are employed for focusing in the two vertically spaced apart film apertures images of the right view and left view of the scene as viewed from two horizontally spaced apart points. The optical means may include a pair of carefully matched rhomboid type prisms. Each of the prisms transmits light corresponding to one view of the stereoscopic pair to its respective corresponding aperture. The rear faces of the prisms are located one above the other opposite the apertures. The front faces are located in a vertical plane, each front face being on an opposite side of a central vertical plane of symmetry of the camera. Suitable lenses are employed for focusing images of the object field onto the film in a film plane behind the respective apertures. The centers of the apertures and the centers of the image fields are spaced apart by a distance somewhat different from an integral multiple of the normal or average interframe distance. The mechanism that is usually employed for advancing the film past the image of the scene one aperture at a time is constructed to advance the film two apertures at a time.

The film produced in such a camera includes series of alternate right and left views of the scene being photographed. In the film produced in this invention stereoscopic images which comprise a pair are not necessarily adjacent to each other but may be separated by an even number of frames in which images of other stereoscopic pairs are photographed. But in any event, in accordance with this invention the distance between images of the same pair are spaced apart by a distance which differs from an integral multiple of the normal or average interframe distance. In the film of this invention the distance between adjacent right and left images on the film is alternately greater than and less than the normal interframe distance.

The use of the described camera in conjunction with the film of this invention provides a superior method and apparatus for accurately positioning a succession of the corresponding stereo image pairs on a common strip of film so that printing and processing and other handling variables do not disturb the satisfactory presentation of the stereoscopic pictures for viewing. Since the use of only one camera and one projector is required for the corresponding stereoscopic pairs the equipment and operating costs are minimized. In some applications an appreciable film economy is achieved without sacrificing film image area. A further advantage resides in the fact that little deviation from normal operating procedures in photography, projection, and film processing is required. A further advantage lies in the utilization of a basically normal image orientation on the film. However, the invention may be practiced in other ways.

The foregoing and other features and advantages of the invention will be understood by reference to the following description taken in connection with the accompanying drawings in which.

Figures 2, 6:
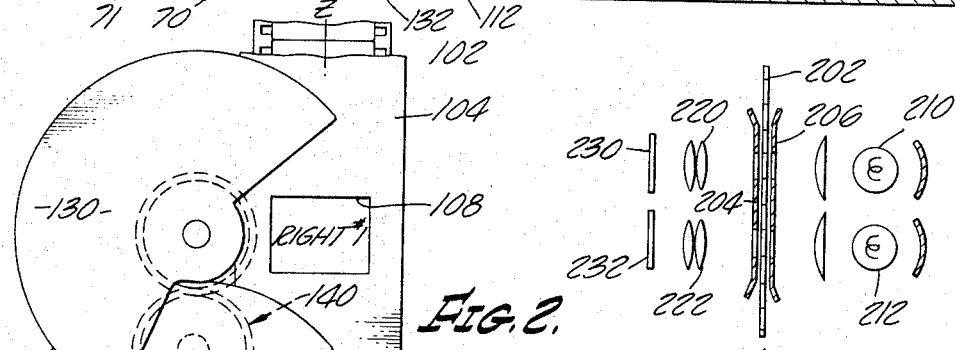
FIG. 2 is a front elevational view on the plane 2—2 of FIG. 1 illustrating parts of the camera including a specific shutter arrangement.
Figure 5:
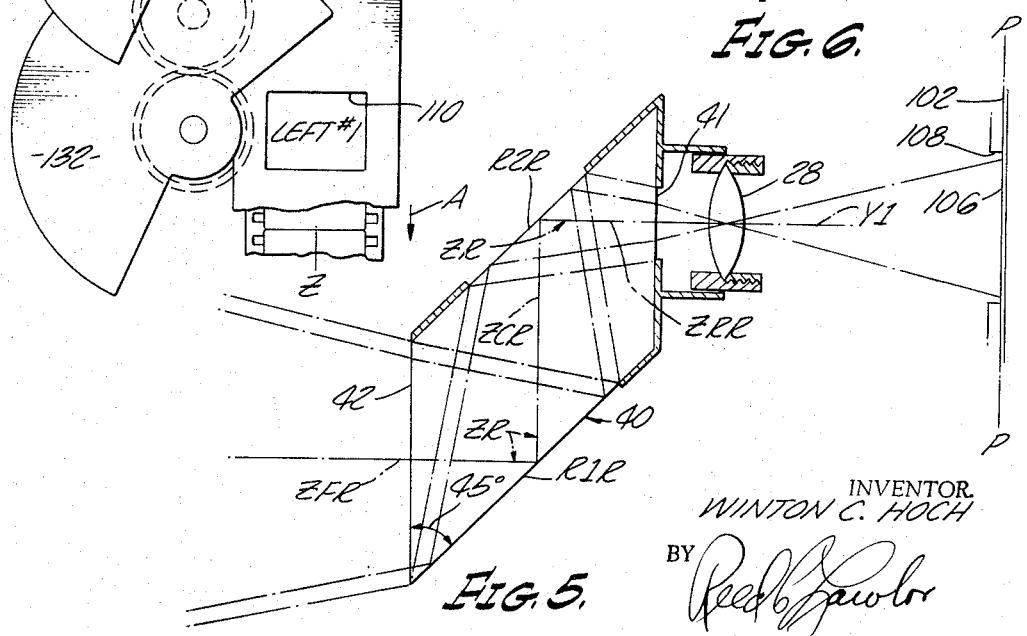
Figure 3:
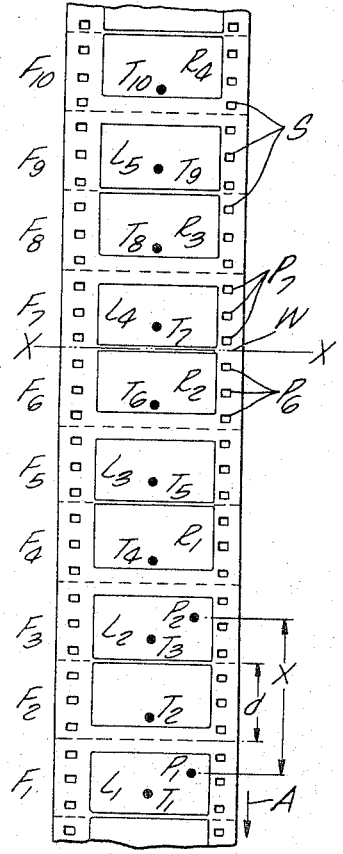
Figure 4:
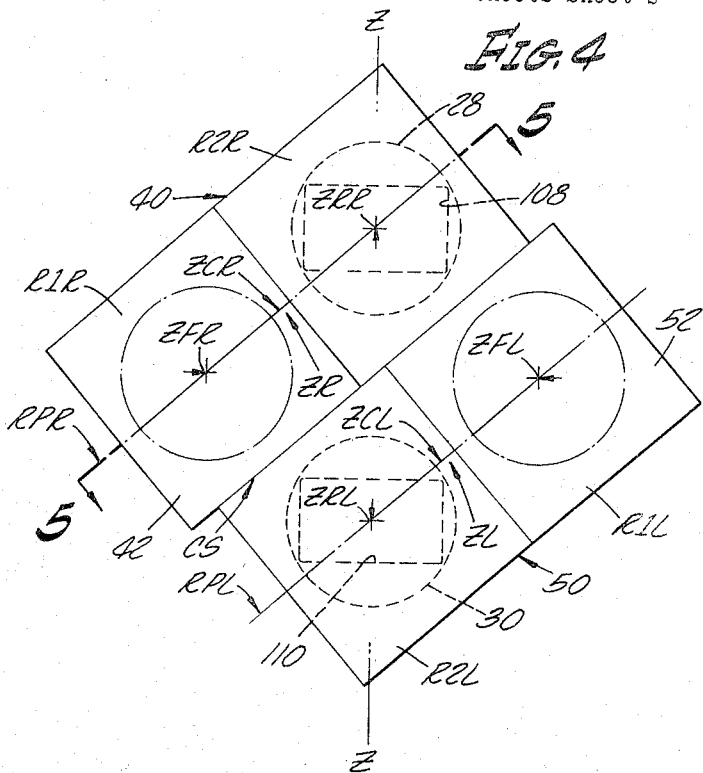
Figure 8:
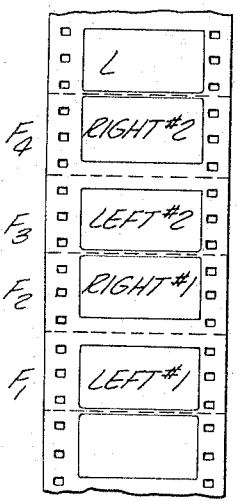
Figure 7:
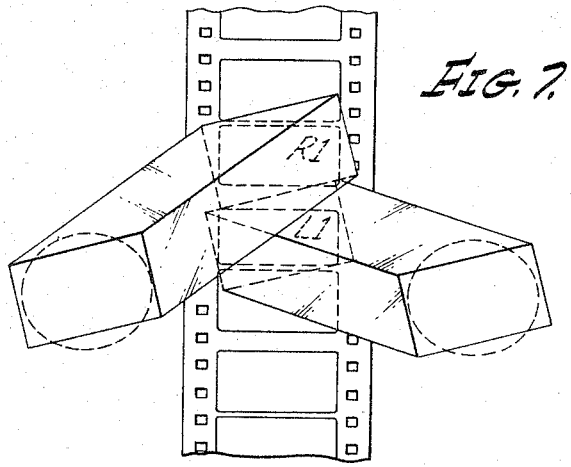

FIG. 3 presents a segment of film produced according to this invention;

FIG. 4 is a front elevational view illustrating a prism arrangement used in one embodiment of the invention;

FIG. 5 is a cross-sectional view on the line 5—5 of FIG. 4 illustrating how light is transmitted through a prism and lens to the film;

FIG. 6 is a fragmentary schematic view of a projection system;

FIG. 7 is a front elevational view schematically illustrating a prism arrangement used in accord with another embodiment of the invention; and FIG. 8 is a view of a film in which the left-view and right-view images of a stereoscopic pair are on adjacent frames.

Figure 1:
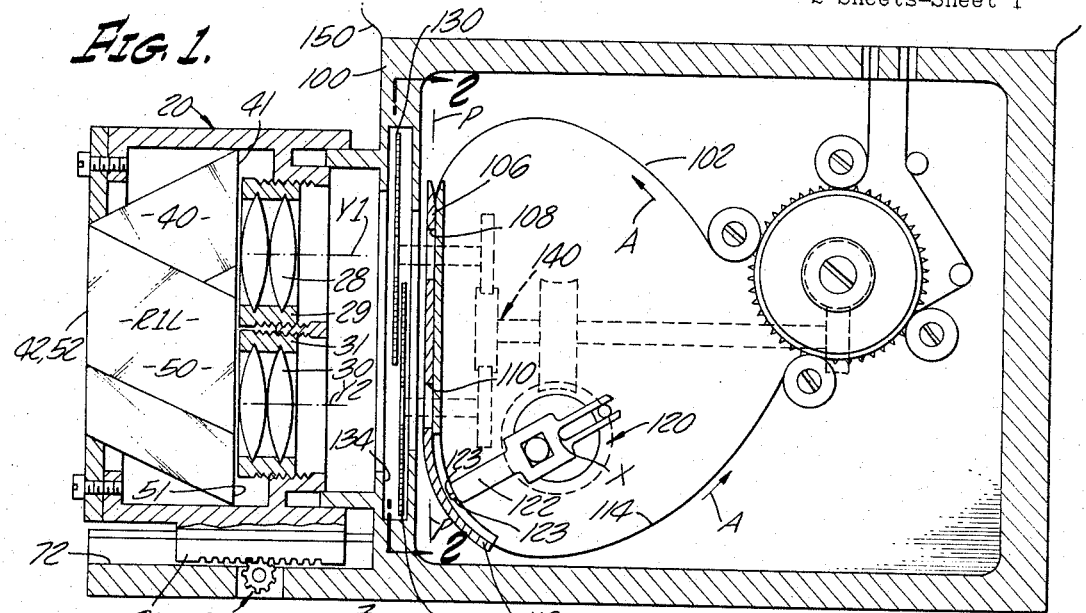
FIGURE 1 is a side vertical view, partly in cross-section, of a motion picture camera embodying one form of this invention.

Referring to the drawings and particularly to FIG. 1, there is shown a portion of a 35 mm. motion picture camera in which the invention has been incorporated.

Though the camera may be employed in other positions, it will be described as though mounted in an upright position in which the film travels along a vertical axis in a film plane P—P (see FIG. 1) and in which the scene being photographed is viewed from the right side and from the left side of a vertical plane of symmetry Z—Z that intersects the film as indicated in FIGS. 2 and 4.

The camera of FIG. 1 employs a special removable lens assembly 20 mounted on the front of a camera housing 100 through which motion picture film is advanced from and to a film magazine 150. This assembly includes two lenses 28 and 30 and two prisms 40 and 50.

The aperture plate 104 is arranged in front of and adjacent to the film plane P—P and a film backing plate 106 is mounted just behind the film plane. The aperture plate 104 is provided with an upper picture aperture 108 and a lower picture aperture 110. As indicated in FIG. 2, the upper and lower edges of the picture apertures 108 and 110 are parallel and horizontal while corresponding sides are collinear, one picture aperture 108 lying above the other 110. The apertures 108 and 110 are of the same shape and size and their centers are spaced apart by a distance slightly different from an integral multiple of the normal interframe distance.

For convenience in definition, the normal or average interframe distance is defined as the average distance between centers of successive frames when the frames are uniformly spaced along the film strip, though in fact, in this invention the images are not uniformly spaced along the film. Stated differently, the normal interframe distance is one-half the distance between successive left-view images and one-half the distance between successive right-view images. In this connection, it is to be noted that the actual height of the frame as measured by the exposed portion of the film is slightly less than the normal interframe distance and small blank spaces of unexposed film normally exist between successive pairs of frames.

In one embodiment of the invention, the left views of the scene being photographed are photographed in alternate frames of the film with corresponding points of the left-view images being spaced apart by a distance equal to twice the normal interframe distance. For example, in FIG. 3, left-view images $L_1$, $L_2$, $L_3$ and $L_4$ are photographed in alternate frames $F_1$, $F_3$, $F_5$ and $F_7$, with corresponding points $P_1$ and $P_2$ of the respective left-view images $L_1$ and $L_2$ being spaced apart by a distance X which is equal to twice the normal interframe distance $d$.

Similarly, as illustrated in FIG. 3, the right-view images $R_1$, $R_2$, $R_3$, and $R_4$ of the scene being photographed are photographed in alternate frames $F_4$, $F_6$, $F_8$, and $F_{10}$ of the film with corresponding points of the right-view images being spaced apart by a distance equal to twice the normal interframe distance.

In the embodiment illustrated in FIG. 3, the frames of a corresponding pair of stereoscopic views are spaced apart by two frames of other non-corresponding views. In FIG. 3 it will be noted that with ten frames numbered consecutively as $F_1$, $F_2$ . . . $F_{10}$, the right and left views of the first exposure #1 are photographed in frames $F_1$ and $F_4$ respectively; those of the second exposure #2 are photographed in frames $F_3$ and $F_6$ respectively; those of the third exposure #3 are photographed in frames $F_5$ and $F_8$ respectively; and so on. The distance between the images forming stereoscopic pairs (e.g. $L_1$ and $R_1$, $L_2$ and $R_2$) is substantially constant. It is also seen in FIG. 3 that the height of each image ($L_1$, $R_1$, $L_2$, $R_2$ . . . ) is slightly less than the normal interframe distance. It is clear that no double exposures occur and that the film is efficiently used.

In the embodiment illustrated in FIG. 3, the film has a set of sprocket holes S along both of its sides. Each frame $F_1$, $F_2$ . . . $F_{10}$ has a similar pattern of sprocket holes. The pattern is repetitive along the length of the film in relation to a series of points $T_1$, $T_2$ . . . $T_{10}$ uniformly spaced by the normal interframe distance.

Although the pattern of sprocket holes may have its endpoints W in the centers of the frames, as shown in FIG. 3, each pattern of sprocket holes has its endpoints between adjacent frames.

Any two adjacent patterns along the length of the film are also symmetrical about a line drawn through their common endpoint and perpendicular to the longitudinal axis of the film. For example, in FIG. 3, the adjacent patterns $P_6$ and $P_7$ are symmetrical with respect to the line X—X through the common endpoint of the patterns $P_6$ and $P_7$. The common endpoint of two adjacent patterns may also be regarded as a nearby reference point. While such symmetrical arrangement is illustrated in which the double frame spacing has six sprocket holes indicated, the invention is also applicable with other sprocket hole patterns.

In order to effect appropriate advancement of the film during the photographing, a film guide 112 in the form of an arcuate extension from the lower end of the aperture plate 104 is arranged concentrically with the axis X of rotation of the arms 122 of an intermittently operating film advancing mechanism 120. Each time these arms 122 rotate through a complete cycle, the claws 123 engage the film 102 and draw the film downwardly past the aperture plate by a distance equal to twice the distance between the centers of two frames, that is a distance equal to twice the normal interframe distance.

The film is advanced downwardly through the camera in the direction as indicated by the arrows A in FIGS. 1, 2 and 3. Portions of the film that are behind the apertures 108 and 110 are exposed simultaneously to right and left views of the scene being photographed by virtue of the operation of a pair of shutters 130 and 132 that are mounted in a vertical recess 134 in front of the aperture plate 104. The two shutters are operated in synchronism by means of a motor-driven train of gears 140 which also operate the film advancing mechanism 120. These shutters remain closed, cutting off the transmission of light to the film behind the picture apertures while the film is being advanced past the picture apertures, but are open for the short period of time that the claws 122 are withdrawn from the film leaving the film stationary. The gear train 140 also serves to draw the film 102 from the camera magazine 150 and return it thereto continuously during the photography. Thus, while the film advancing mechanism is in its position as shown in FIG. 1, the shutters are in their closed position, preventing light from reaching the film through the picture apertures, and the shutters are in their open position indicated in FIG. 2 while the film advancing mechanism 120 is in its inactive, or non-transporting, state in which the film is stationary opposite the picture apertures.

The lens assembly 20 that is employed for producing stereoscopic motion pictures that embody the invention comprises a light-tight cylindrical housing member 22 that telescopes with a cylindrical flange 24 that projects forwardly from the front wall of the housing 100. A pair of matched lenses 28 and 30 are mounted one above the other, their optical axes $Y_1$ and $Y_2$ respectively extending horizontally to the centers of the upper and lower picture apertures 108 and 110. The right and left views of the scene being photographed are projected through right and left prisms 40 and 50 respectively, the right view of the scene being projected through the upper lens 28 into the upper picture aperture 108 and the left view of the scene being projected through the lower lens 30 into the lower picture aperture 110. Two synchronized, or interlocked, adjustable lens stops (not shown) of conventional design are arranged on the light paths, to control the amount of light reaching the film in accordance with principles that are well known in the art of photography.

The rear faces 41 and 51 of the two prisms 40 and 50 are coplanar, lying in a vertical plane parallel to the film plane. The front faces 42 and 52 are also coplanar lying in a second vertical plane also parallel to the film plane. As indicated in FIGS. 4 and 5, each of the two prisms 40 and 50 have optical axes ZR and ZL respectively. The central portion ZCR of the optical axis of the right prism 40 is parallel to the front and rear faces 41 and 42 thereof. The central portion ZCL of the optical axis ZL of the prism 50 is parallel to the front and rear faces 51 and 52 thereof. The front and rear portions ZFR and ZRR of the optical axis of the right prism are perpendicular to the central portion ZCR and to the front and rear faces 41 and 42 of the right prism. Likewise the front and rear portions ZFL and ZRL of the optical axis ZL of the left prism are perpendicular to the central portion ZCL and to the front and rear faces 51 and 52 respectively of the left prism 50. The rear portion ZRR of the optical axis of the right prism coincides with the optical axis $Y_1$ of the upper lens 28. Similarly, the rear portion ZRL of the optical axis of the left prism coincides with the optical axis $Y_2$ of the lower lens.

The front portions ZFR and ZFL of the optical axes of the two prisms are spaced apart by a distance approximately equal to the interocular distance of a pair of human eyes, that is, they are about 2.5 in. or some other suitable fixed distance apart. These portions ZFR and ZFL of the optical axes of the prisms are symmetrically located on opposite sides of the plane of symmetry Z—Z and lie in a common horizontal plane. A right plane RPR of the right prism 40 includes the optical axis of the right prism 40 including the rear portion ZRR, the central portion ZCR and the front portion ZFR. A right plane RPL of the left prism 50 includes the optical axis of the left prism 50 including the rear portion ZRL, the central portion ZCL, and the front portion ZFL.

Each of the prisms includes two reflecting surfaces arranged at an angle of 45° with respect to the rear and front faces thereof respectively. The two internal totally reflecting surfaces of each prism are parallel. The first face in which light from the scene being photographed is reflected is called the first reflecting surface. The next reflecting surface to which light is reflected therefrom and thence to the lens is called the second reflecting surface. Thus, as indicated in FIG. 5, light entering the right prism 40 enters the front face 42 and is reflected by the first reflecting surface R1R to the second reflecting surface R2R and thence to the upper lens 28. Similarly, light entering the left prism 40 enters the front face 52 and is reflected by the first reflecting surface R1L to the second reflecting surface R2L and thence to the lower lens 30.

In order to control the focus of the lenses, the lens assembly 20 is moved inwardly and outwardly with the housing by means of a rack and pinion assembly 70, or other focusing mechanism to bring the views of the scene into focus at the film plane P—P. A wing or fin 71 extending from the tubular housing 22 rides in a slot 72 in order to maintain the alignment of the lens and prism assembly 20 during focusing. It will be noted that the upper lens 28 is mounted in a barrel 29 and the lower lens 30 is mounted in a barrel 31 and that each of these barrels is threadably attached to the lens housing 22. With this arrangement, either lens may be moved along its own axis relative to the other in order to make sure that the two lenses bring the right and left views of the scene into focus simultaneously in the film plane P—P.

During the photography a right-view image of the scene is formed at the upper aperture 108 by the light transmitted through the right prism 40 and the upper lens 28 and a left-view image of the scene is formed at the lower aperture 110 by the light transmitted through the left prism 50 and the lower lens 30.

During the photography, the film is alternately advanced and exposed, the film being exposed to a right-view image and a left-view image of the scene simultaneously while the film is at rest. As a result, a film is produced in which one set of alternate frames represents a sequence of left views and a second set of alternate frames represents right views and in which the left view and the right view to which the film is simultaneously exposed are spaced apart by two frames as indicated in FIG. 3. Thus, where successive frames are numbered $F_1$, $F_2$, $F_3$ . . . $F_{10}$ as indicated in FIG. 3, the right and left views seen at time #1 appear at frames $F_1$ and $F_4$ while the right and left views seen at time #2 appear at the frames $F_3$ and $F_6$, the right and left views seen at time #3 appear at frames $F_5$ and $F_8$, etc.

Normally, the photography occurs with the camera upright and with the left-right axis that is the line between the centers of the front faces of the prisms extending horizontally. It is to be noted that the photographic process described here is of the usual type in which the vertical axis of the scene being photographed normally extends along the length of the film and the horizontal axis normally extends transversely of the film.

In any event, whether or not the photography is performed with the camera upright, the left-right axis of the image lies transversely of the length of the film. The format of stereoscopic film produced in this invention lends itself to projection with projectors of the conventional type in which the film is drawn through the projector along an axis corresponding to the vertical axis of the screen on which the resultant stereoscopic picture is being viewed.

After the motion picture has been photographed in accordance with this invention, it may be projected by a suitable projection system such as that illustrated schematically in FIG. 6. Here, the film 202 is intermittently advanced a uniform amount equal to twice the normal interframe distance between a projection aperture plate 204 and a backing plate 206 which is located between a pair of incandescent lamps, xenon arc lights, or other light sources 210 and 212 and a pair of projection lenses 220 and 222 adjusted to focus the right and left views on the screen with corresponding image points substantially at the same height and appropriately spaced horizontally for comfortable viewing. The light source 210, the lenses 220 and the plate 230 comprise the right-view section of the projector, and the light source 212, the lenses 222 and the plate 232 comprise the left-view section of the projector. These lenses project images of the positive film through polarizing plates 230 and 232 onto a non-depolarizing viewing screen. The two beams are projected with light that is polarized in planes that are at right angles to each other and the projected images are viewed by spectators wearing spectacles that have polarizing elements that are polarized at right angles to each other in a manner well known in the art. Thus, with this arrangement, a stereoscopic view of the original scene is obtained.

One method used for coding the pictures photographed to indicate whether or not they are properly registered in projection is explained in connection with FIGS. 3 and 4. In this case the prisms 40 and 50 and lenses 28 and 30 are arranged to offset the right-view image upwardly from a position in the center of the frame and the left-view image downwardly from a position in the center of the frame and the apertures 108 and 110 are likewise offset vertically.

The desired offset may be established by selecting the dimensions of the prisms 40 and 50 in such a way that the centers of the rear prism faces 41 and 51 are located opposite the centers of the apertures 108 and 110 and locating the centers of the front faces 42 and 52 of the prisms on a horizontal line with the distance between them equal to the interocular distance. Such an arrangement is illustrated in FIG. 4.

By offsetting the right-view and left-view images, the positioning of the images on the film forms a pattern illustrated in FIG. 3. Referring to FIG. 3, it will be noted that all of the left-view images have been displaced in one direction (downwardly) relative to the right-view images while all the right-view images have been displaced in the opposite direction (upwardly) relative to the left-view images. While the spacing between successive left images is constant and while the spacing between successive right images is constant and while the constant spacings in the two sets of images are equal, the distances between centers of pairs of successive images are alternately a few percent greater than and a few percent less than the normal interframe distance. For example, the distance between the centers of the successive images $L_2$ and $R_1$ is a few percent greater than the normal interframe distance, and the distance between the centers of the successive images $R_1$ and $L_3$ is a few percent less than the normal interframe distance.

In FIG. 3, it is also seen that the center of any given image, such as $R_1$, does not lie at the midpoint of the centers of the adjacent images $L_2$ and $L_3$. The center of the image $R_1$ is located along the length of the film a few percent of the normal interframe distance from the midpoint between the centers of the adjacent images $L_2$ and $L_3$ on opposite sides of $R_1$.

In practice, in projecting the film embodying this invention, the projector is set to superimpose corresponding right and left views on the screen. Once this has been done, then if an error of some kind occurs causing the left views to be projected through the right-view section of the projector or the right views through the left-view section of the projector, the two views will no longer be superimposed, or fully overlapped, on the screen. Instead, the two views will overlap only partially, leaving a margin or bar at the top and bottom of the screen in which only one of the views can be seen. This error will be so obvious that immediate correction can be made. Such errors may arise in threading the film in the projector or they may arise in splicing the film. By providing against the projection of the left views through the right-view section of the projector and then right views through the left-view section of the projector without detection, projection errors that might otherwise produce inversion of stereoscopic effects or that might provide pseudo stereoscopic effects are precluded.

Satisfactory results can be obtained by displacing the center of each image from the center of its frame by a distance of about 5 percent of the normal interframe distance for a frame height of 0.560″. This amounts to a displacement of each of the images of 0.028″. It is not necessary that the displacement be 5 percent. The advantages of this invention may be obtained even if the displacement is as low as 1 percent or as much as 10 percent. However, a displacement of at least about 4 percent makes the invention very effective.

When the centers of the images are displaced from the centers of their respective frames by P percent, the centers of the right-view images are displaced relative to the centers of the left-view images by twice that amount, that is, 2P% of the normal interframe distance. Thus, where the center of each image is displaced from the center of its frame by a distance of 4%, the distance between right- and left-view images differs from an integral multiple of the interframe distance by 8% of the normal interframe distance.

With this arrangement, greater working space is provided between the image areas, thus facilitating both photography and projection of stereoscopic pairs. Such greater working space provides more effective operation than could be obtained with the films in the prior art in which the two images of a stereoscopic pair are displaced toward each other.

When each picture aperture is accordingly offset from the center of its frame by a distance equal to a few percent (P%), say between about 1 percent to about 10 percent of the normal interframe distance, there is between 4 percent and 40 percent failure of overlap in projected images if they are not properly registered in a projector that has been previously correctly aligned for satisfactory projection. When the two sets of images are displaced P% from the normal spacing, the centers between one pair of images such as $R_1$ and $L_3$ will be 2P% less than the normal interframe distance and the centers between the next pair such as $L_2$ and $R_1$ will be 2P% greater than the normal interframe distance. These displacements are doubled again if there is an error in projection.

When employing the arrangement that produces the image location pattern illustrated in FIG. 3, it is not necessary to place registration marks on the edge of the film as with the mechanism of FIG. 2. Thus, not only does the offsetting of the apertures slightly provide a simple keying or identification technique, but it makes possible the elimination of the auxiliary equipment that might otherwise be needed for placing identification marks on the film.

In another embodiment of this invention, the left views of the scene being photographed and the right views of the scene being photographed are photographed in alternate frames of the film with the frames of a corresponding pair of stereoscopic views being on adjacent frames as shown in FIG. 7. In FIG. 7 it is seen that the right and left views of exposure #1 are photographed in adjacent frames $F_1$ and $F_2$.

In order to photograph the left-view image and right-view image of a stereoscopic pair on adjacent frames, the apertures of the camera through which the light passes are adjacent rather than spaced apart as in the embodiment shown in FIG. 2. The prisms used to produce the film as shown in FIG. 8 are narrower than the prisms of FIG. 4 and arranged as shown in FIG. 7. In this embodiment, the lenses 28 and 30 are mounted in front of the prisms 80 and 90.

If larger working space between the two images of each stereoscopic pair is needed to accommodate the optical and mechanical parts of the camera, the apertures may be located four, six, eight or more frames apart. But for most efficient film usage, the film is still advanced by only two frames between exposures in order to achieve the desired photographic results.

While the invention has been described in reference to a camera employing a pair of rhomboidal prisms, it may be produced in other types of cameras making use of other types of optical means for transmitting horizontally displaced right and left views of a scene to corresponding vertically displaced image apertures. Thus, for example, instead of employing prisms, use may be made of mirrors. In some cases, advantages may also be taken of fiber optics.

The offsetting of right- and left-view images in the film of this invention may also be accomplished in the printing processes. Thus, if a motion picture is produced, as has been the case in the past, with the right and left views of images uniformly spaced along the film, the offsetting may be produced in the printing processes. A film of the type embodying this invention may also be produced from a pair of separate films on which the right and left views have been separately recorded. Thus, films heretofore photographed by conventional methods may be reprinted to provide films of the type described herein and thus the advantages of this invention obtained even without the use of the type of cameras specifically illustrated herein.

In view of the foregoing, it will be understood that the invention may be embodied in many other forms within the scope of the appended claims.

The invention claimed is:

1. A stereoscopic motion picture film having lengthwise thereon a row of alternate right- and left-view images representing a succession of stereoscopic pairs and having the same orientation on the film, the left-right axes of the images extending transversely of the length of the film, corresponding points of the right-view images being spaced apart by a distance equal to twice the normal interframe distance, corresponding points of the left-view images being likewise spaced apart by a distance equal to twice the normal interframe distance, the distance between centers of images forming the respective stereoscopic pairs being substantially constant and being greater than the normal interframe distance, the height of each image being less than the normal interframe distance, the distances between centers of pairs of successive images being alternately a few percent greater than and a few percent less than the normal interframe distance.

2. A stereoscopic motion picture film as set forth in claim 1 wherein said few percent lies between 1 percent and 10 percent.

3. A stereoscopic motion picture film wherein said few percent is at least 4 percent.

4. A stereoscopic motion picture film having a set of sprocket holes along at least one side thereof, said sprocket holes being spaced in a uniform manner points thereon in a repetitive pattern in relation to a series of uniformly spaced points along the length of the film and separated by the normal interframe distance, each pattern of sprocket holes being symmetrically arranged with respect to a nearby reference point along the length of the film, said film having lengthwise thereon a row of alternate right- and left-view images representing a succession of stereoscopic pairs that are spaced apart a distance greater than the normal interframe distance, the left-right axes of the images extending transversely of the length of the film, corresponding points of the right-view images being spaced apart by a distance equal to twice the normal interframe distance, corresponding points of the left-view images being likewise spaced apart by a distance equal to twice the normal interframe distances, the centers of the right-view images being displaced in one direction along said film relative to the centers of the left-view images by a small percentage of the interframe distance, the height of each image being less than the normal interframe distance.

5. A stereoscopic motion picture film as set forth in claim 3 wherein said small percentage lies between 2 percent and 20 percent.

6. A stereoscopic motion picture film having lengthwise thereon a row of alternate right- and left-view images representing a succession of stereoscopic pairs and having the same orientation on the film, the left-right axes of the images extending transversely of the length of the film, corresponding points of the right-view images being spaced apart by a distance equal to twice the normal inter-frame distance, corresponding points of the left-view images being likewise spaced apart by a distance equal to twice the normal interframe distance, the distance between images forming stereoscopic pairs being substantially constant and being greater than the normal interframe distance, the height of each image being less than the normal interframe distance, the center of each image being located along the length of the film a distance of a few percent of the normal interframe distance from the midpoint between the centers of the adjacent images on opposite sides of said each image.

References Cited

UNITED STATES PATENTS

| 2,520,842 | 8/1950 | Jullet | 352—42 |
| 2,554,532 | 5/1951 | Jullet | 88—24 |
| 2,991,690 | 7/1961 | Grey et al. | 81—1 |

FOREIGN PATENTS

| 376,713 | 6/1907 | France. |
| 671,916 | 5/1952 | Great Britain. |
| 1,137,309 | 1/1957 | France. |
| 1,323,509 | 3/1963 | France. |

JULIA E. COINER, *Primary Examiner.*